UNITED STATES PATENT OFFICE.

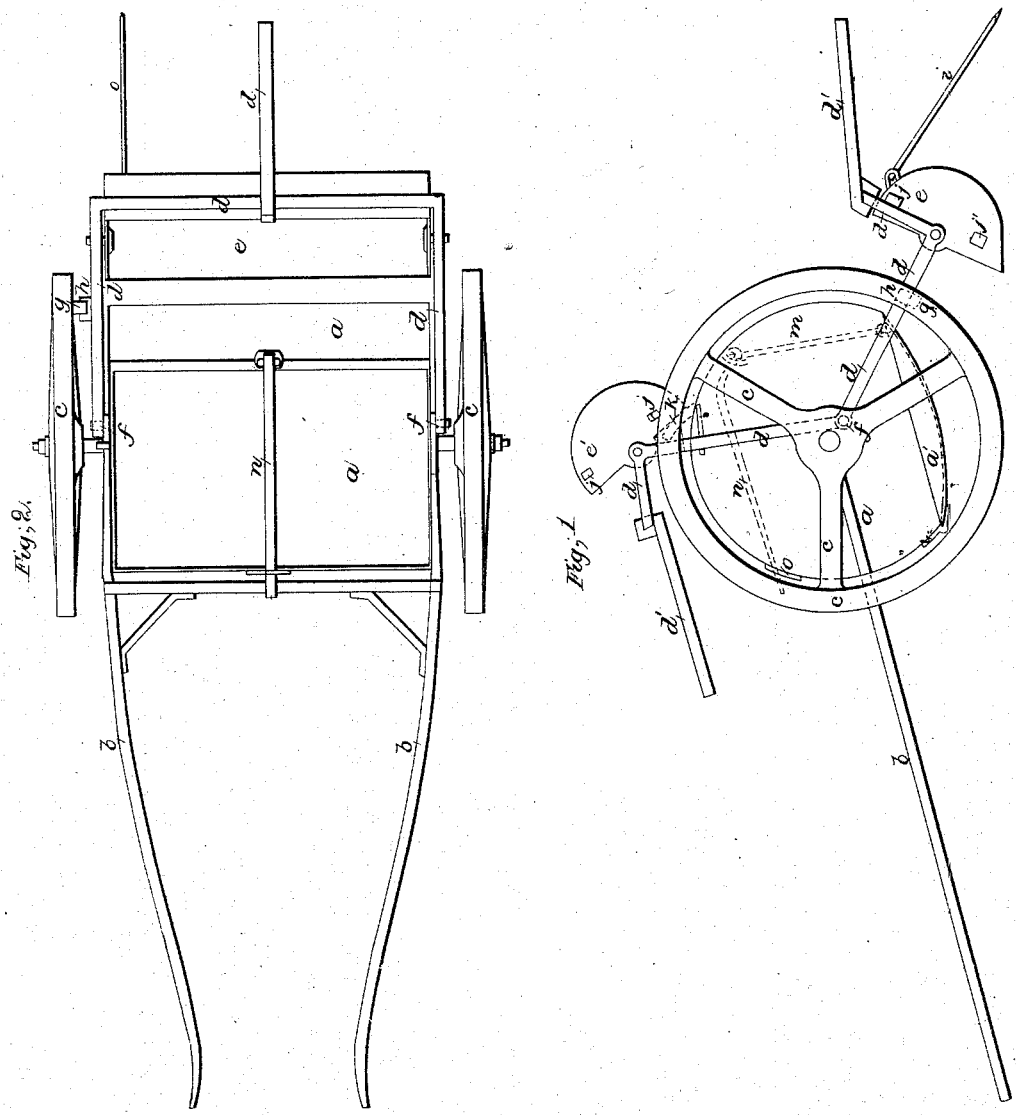

SAMUEL W. SOULE, OF ST. LOUIS, MISSOURI.

IMPROVED EXCAVATOR.

Specification forming part of Letters Patent No. 17,174, dated April 28, 1857.

*To all whom it may concern:*

Be it known that I, SAMUEL W. SOULE, of the city and county of St. Louis, and State of Missouri, have invented a new and Improved Excavator; and I do hereby declare that the following is a full and exact description thereof, reference being had to the accompanying drawings, making a part of this specification, in which—

Figure 1 is a side elevation showing two positions of the scraper—that of filling $e$ and that of emptying $e'$. Fig. 2 is a plan, with the scraper in the position of filling.

Similar letters of reference indicate corresponding parts in the two figures.

The nature of my invention consists in attaching a scraper to a cart or wagon or other vehicle, and of so arranging and connecting it that it shall be automatic in its operations and entirely under the control of an operator, and so that it may be readily detached from the cart or wagon and have them unencumbered, as before.

The following description of my invention will enable any one acquainted with mechanics to construct and operate it. I take a cart or wagon and on each side of the body or frame I fix a center, a short distance back of the axle and a little below its center, as shown at $f$. To these centers or pivots I hang the frame $d$, and on it I make a lug on one or both sides to correspond with lugs on the rim of the wheels. When the scraper $e$ is on the ground, the scraper $e\,e'$ is hung on the frame $d$ on pivot-journals, so as to vibrate freely about one-fourth of a revolution, being governed by pins or lugs $j$ and $j'$ from revolving further, and $d'$ is a lever attached to frame $d$, by which the operator governs the action of the scraper. $i$ is a rod fixed to the scraper to arrest its fall and to turn its edge downward and place it in position for filling. When it reaches the ground now, the position of the center $f$ being at the side of the axle, the scraper in rising will describe an eccentric curve around the said axle, so that when the scraper is on the ground the distance between the center of the axle and the lug $h$ (see Fig. 2) on the frame $d$ will be greater than when the scraper is elevated to its emptying position, which will cause the lug $g$ (see Fig. 2) on the wheels to pass over the lug $h$, thus detaching themselves when the scraper is elevated in an emptying position, and the cart continuing in a forward direction, having the scraper to fall back after discharging its load, and by the time the scraper has again filled the lug on the wheel carries the scraper up as before, &c. The pin or lug $j$ (see Fig. 1) holds the scraper in position for filling, and $j'$ for emptying, which is assisted by the projection $k$, Fig. 1. $a'$ is the bottom of the body, to which are fastened hinges $l$, bail $m$, and lever $n$ for the purpose of discharging the load when required. As the cart is moved along, the scraper $e$ will fill with earth or other substance to be removed, (and the scraper may be also raised from obstructions while filling, or depressed to produce a deeper cut by the lever $d'$,) until the lug $g$ on the wheel $c$ in revolving grapples with the lug $h$, thereby raising the scraper over the body of the cart and discharges therein, it (the scraper) being turned by the pin or lug $j'$ and projection $k$. At this time the lugs $g$ and $h$ pass each other, as before shown, and the scraper falls back to position again for filling, it being arrested in its fall by rod $i$, which is hung to the right side of the scraper and let down easily, and then works as described, &c. When the cart is sufficiently loaded, the frame $d$ (while the scraper is emptying) is moved by the operator a little farther than it is carried by the lug $g$, which causes it to be clasped by a spring $s$, and thereby held in an upright position until the load is discharged, which is done by pulling the lever $n'$ from the fastening $o$, and the bottom of the body $a'$ falls down, which can be done without stopping the team.

Having thus described my invention, what I claim as new, and desire to secure by Letters Patent, is—

The frame $d$, lever $d'$, lugs $g$ and $h$, rod $i$, and pins or lugs $j$ and $j'$, and projection $k$ or their equivalents for the purpose of mechanically operating a scraper, as described and illustrated.

SAMUEL W. SOULE. [L. S.]

Witnesses:
C. W. KENWORTHY,
L. C. WAITE.